UNITED STATES PATENT OFFICE.

ALBERT G. CRAWFORD, OF CHICAGO, ILLINOIS, ASSIGNOR TO HALLECK W. SEAMAN, OF CHICAGO, ILLINOIS.

REFRIGERATING-GAS AND PROCESS OF MAKING THE SAME.

14,955. Specification of Reissued Letters Patent. Reissued Oct. 12, 1920.

No Drawing. Original No. 1,325,666, dated December 23, 1919, Serial No. 219,119, filed February 25, 1918. Application for reissue filed July 29, 1920. Serial No. 399,918.

*To all whom it may concern:*

Be it known that I, ALBERT G. CRAWFORD, a citizen of the United States, and a resident of the city of Chicago, in the county of Cook and State of Illinois, have invented certain new and useful Improvements in a Refrigerating-Gas and Processes of Making the Same; and I do hereby declare that the following is a full, clear, and exact description of the same.

The common refrigerating gases, such as ammonia, sulfur dioxid, and ethyl chlorid, which are now extensively used commercially for refrigerating purposes, possess obnoxious properties and are objectionable in that they not only are poisonous and corrosive to the pipes or receptacles in which they are used, but some also require a heavy pressure to condense them into the liquid state.

This invention relates to an improved refrigerating gas produced by mixing a small amount of liquid sulfur dioxid, but not sufficient to corrode, with hydro-carbon gases obtained from casing head gas, or with those hydrocarbons of low boiling point belonging to the paraffin, or olefin (ethylene) series. The resultant refrigerating gas is non-poisonous, has practically no corrosive effect upon pipes or receptacles in which it is used, has a low boiling point, and furthermore can be liquefied under a low pressure.

It is an object of this invention to provide a refrigerant by mixing liquid sulfur dioxid with a hydrocarbon gas to produce a gas having a lower boiling point than either of these two materials, and adapted to be liquefied under a pressure less than that required for the liquefaction of the refrigerants now in common use.

It is also an object of the invention to produce a refrigerating gas by mixing liquid sulfur dioxid with a liquid hydro-carbon of a relatively low boiling point whereby a refrigerant is produced having a varying boiling point dependent upon the proportions of the sulfur dioxid gas used, which is not sufficient to cause appreciable corrosion.

The following is a full, clear and exact description of the ingredients and process of mixing the same to form a refrigerating gas covering the principles of this invention.

To form a refrigerating gas producing the most satisfactory results commercially, having a very low boiling point, and adapted to be liquefied under a low pressure, of say approximately 40 pounds per square inch, a chief ingredient consisting of hydro-carbon gases usually found in casing head gas containing large percentages of propane and butane, is used. The refrigerating liquid will have a variable boiling point, depending upon the percentages of propane and butane contained in the hydro-carbon gas used. Propane, $C_3H_8$, has a boiling point of $-45°$ C., and butane, $C_4H_{10}$, has a boiling point of $1°$ C., so that a mixture of these gases, as found in casing head gas, will have a varying boiling point, depending upon the percentage of hydro-carbon gases present.

It has been found that by adding to the liquefied hydrocarbon gases, a small quantity of liquid sulfur dioxid, which has a boiling point of $-10°$ C., a much lower boiling point is obtained in the resultant mixture than that of the gases comprising the mixture. When the liquid sulfur dioxid is added to the liquefied hydro-carbon gas a violent boiling takes place and then a mechanical separation occurs in which the liquid sulfur dioxid, being heavier, settles to the bottom of the container and can be drawn off, leaving a resultant liquid which still has the same low boiling point as the original mixture and contains only a small percentage of sulfur dioxid. A stable liquefiable gas is thus obtained, which, on account of the very small percentage of sulfur dioxid gas remaining therein, is practically non-corrosive and does not destroy articles with which it may come into contact in a refrigerating machine, should some parts of the machine fail.

A refrigerating liquefiable gas having a boiling point of $-17.77°$ C. is obtainable by mixing a small quantity of liquid sulfur dioxid with a hydro-carbon composed chiefly of propane and butane having an initial boiling point of $-8°$ C., for example, by adding 30 parts by weight of liquid sulfur dioxid, which has a boiling point of $-10°$ C., to 70 parts by weight of a hydro-carbon having a boiling point of $-8°$ C., a mixture is obtained having a boiling point of $-17.77°$ C. After the mixture has stood a few minutes the liquid sulfur dioxid separates and, being heavier, settles to the bottom of the container and is drawn off, leaving a refrigerant liquid having the same low boiling point, —17.77° C. The refrigerant liquid made according to the above formula contains 3.5 per cent. by weight of sulfur dioxid in the finished product.

A mixture of 10 per cent. liquid sulfur dioxid and 90 per cent. of hydro-carbon by weight, having a boiling point of —8° C., produces a liquid refrigerant having a boiling point of —13° C., and containing 2.33 per cent. by weight of sulfur dioxid in the finished product.

A mixture of 5 per cent. of sulfur dioxid with 95 per cent. of a hydro-carbon by weight with a boiling point of —8° C., after drawing off the liquid sulfur dioxid produces a refrigerating liquid having a boiling point of —11° C. and containing 1.24 per cent. by weight of sulfur dioxid in the finished product.

Above results indicate conclusively that the addition of a relatively small amount of liquid sulfur dioxid to a hydro-carbon gas, as represented in the above illustrative cases, produces a highly efficient refrigerating gas which has a lower boiling point than either of the two above gases comprising the mixture. It has also been found that instead of increasing the pressure necessary to liquefy the refrigerating gas, the pressure necessary to convert the refrigerating gas into the liquid state is actually diminished. Consequently the resulting gas is more readily available for refrigerating purposes and can be adapted commercially with comparatively cheap installation, due to the fact that it has a very low boiling point, and because it can be liquefied under lower pressures than any of the gases now commonly used in refrigeration. Furthermore, due to the small amount of sulfur dioxid remaining in the refrigerating gas, the gas is not obnoxious and the corrosive action is so slight as to be practically negligible. Consequently the refrigerant, owing to the above named characteristics, is particularly adapted for use in light, small or portable machines.

This refrigerant is also peculiarly adapted for large commercial plants. In such plants, heretofore, because of the exceedingly heavy pressure necessary with carbon dioxid and ammonia, the installation has of necessity been massive. Powerful compressors have been required, and, owing to the corrosive action of some of these refrigerants, desirable metals such as aluminum could not be used successfully. With such refrigerants, also, the problem of lubrication is difficult because the refrigerants used attack the lubricants and destroy their lubricating properties. In such installations danger to the plant and the operators is always present, due to the aforesaid corrosive action and due to the exceedingly high pressure at which the refrigerant is used and the noxious properties thereof, should any escape, endangering life and injuring the products subjected to the refrigeration. In my invention no appreciable corrosive effect occurs. My refrigerant, when prepared, is neither dangerously noxious nor injurious to the material submitted and any desired metal, including aluminum, may be used. The initial expense for construction of large refrigerating units is thus materially reduced and greater safety and reliability of operation is obtained, as well as economies effected both in the price of the refrigerant and in the cost of operation.

It will be found that by mixing liquid sulfur dioxid with other hydro-carbon gases, such as those from the olefin or ethylene series, similar results are obtainable, but on account of the cheapness and abundance of the casing head gas, the same is preferably used with liquid sulful dioxid to obtain the desired refrigerating gas for commercial use.

It will of course be understood that other hydro-carbon gases than those mentioned may be mixed with liquid sulfur dioxid to produce a refrigerant embodying the principles of this invention, and that ammonia gas or carbon dioxid gas may be substituted for or used in conjunction with the sulfur dioxid gas to form a refrigerant possessing commercial advantages over ammonia and other refrigerants at present in common use. Numerous other details of the invention may be varied through a wide range without departing from the principles thereof, and I therefore do not purpose limiting the patent granted otherwise than necessitated by the prior art.

I claim as my invention:

1. The process of forming a refrigerant by mixing liquid sulfur dioxid with a liquefied hydro-carbon gas including propane in its composition.

2. The process of forming a refrigerant by mixing liquid sulfur dioxid with a liquefied hydro-carbon gas, permitting the mixture to stand until the sulfur dioxid has settled and then drawing off the settled liquid sulfur dioxid.

3. A refrigerant comprising a mixture of liquid sulfur dioxid with a liquefied hydro-carbon gas, the mixture having a lower boiling point than either of said constituents alone.

4. The process of forming a refrigerant by mixing a small amount of liquid sulfur dioxid with a larger amount of a liquefied hydro-carbon gas.

5. A refrigerant comprising a mixture of sulfur dioxid, butane and propane gases.

6. A refrigerant comprising a mixture of sulfur dioxid gas with a hydro-carbon mixture consisting mainly of butane and propane.

7. A refrigerant comprising butane and propane and a trace of sulfur dioxid, said refrigerant having a lower boiling point than either the mixture of butane and propane alone, or the sulfur dioxid used in the mixture.

In testimony whereof I have hereunto subscribed my name in the presence of two subscribing witnesses.

ALBERT G. CRAWFORD.

Witnesses:
NELS ANDERSON,
FRANK M. CLARK.